UNITED STATES PATENT OFFICE.

JOHN C. WILLS, OF OWINGSVILLE, KENTUCKY.

IMPROVEMENT IN MEDICAL COMPOUNDS OR WORM-CANDIES.

Specification forming part of Letters Patent No. 122,507, dated January 2, 1872.

I, JOHN C. WILLS, of Owingsville, Bath county, Kentucky, have invented a new and useful Worm Candy, of which the following is a specification.

The object of this invention is to present vermifuge disguised and protected by an exterior coating of common stick-candy without being incorporated into the latter's substance. The medicine is thus protected from air, light, moisture, and wastage, and is in a form that children will readily take.

I take the medicine—which may be, for example, santonine alone, or combined with half its weight of calomel—one part, and combine it with an equal weight of candy in mass. I then inclose this in about ten times its volume of candy in mass, and draw the same out into sticks in manner well known to the trade. I then cut into sticks of about one dram each, and of which the medicated portion is about six grains—to wit, three grains of candy and three of medicine at the very center of the stick.

While designed and claimed more particularly for worm medicine, I reserve the right of inclosing and protecting other medicines in the same way.

I claim herein, as new and of my invention, the new article of manufacture, to wit—

A stick of candy having a medicated core or central portion.

In testimony of which invention I hereunto set my hand.

JOHN C. WILLS.

Attest:
GEO. H. KNIGHT,
R. GUDGELL.
(98)